(12) United States Patent
Jeffery

(10) Patent No.: US 11,028,892 B2
(45) Date of Patent: Jun. 8, 2021

(54) VEHICLE BRAKE COOLING SYSTEM AND METHOD OF USE

(71) Applicant: William Jeffery, Mesa, AZ (US)

(72) Inventor: William Jeffery, Mesa, AZ (US)

( * ) Notice: Subject to any disclaimer, the term of this patent is extended or adjusted under 35 U.S.C. 154(b) by 0 days.

(21) Appl. No.: 16/247,213

(22) Filed: Jan. 14, 2019

(65) Prior Publication Data

US 2019/0219118 A1 Jul. 18, 2019

Related U.S. Application Data

(60) Provisional application No. 62/617,950, filed on Jan. 16, 2018.

(51) Int. Cl.
| | | |
|---|---|---|
| *F16D 65/84* | (2006.01) | |
| *B60T 5/00* | (2006.01) | |
| *F16D 65/853* | (2006.01) | |
| *F16D 65/78* | (2006.01) | |
| *F16D 66/00* | (2006.01) | |

(52) U.S. Cl.
CPC ........... *F16D 65/853* (2013.01); *F16D 65/84* (2013.01); *F16D 2065/783* (2013.01); *F16D 2065/786* (2013.01); *F16D 2066/001* (2013.01); *F16D 2066/005* (2013.01)

(58) Field of Classification Search
CPC ...... F16D 65/85; F16D 65/178; F16D 65/827; F16D 65/853; F16D 65/84; B60T 5/00
USPC .............................. 188/264 CC, 264 D, 264 F
See application file for complete search history.

(56) References Cited

U.S. PATENT DOCUMENTS

| | | | | |
|---|---|---|---|---|
| 8,806,882 | B2 * | 8/2014 | Bennion | F01P 7/165 62/323.1 |
| 2015/0001013 | A1 * | 1/2015 | Mennie | F16D 65/092 188/73.1 |
| 2020/0056670 | A1 * | 2/2020 | Gou | B60T 17/22 |

FOREIGN PATENT DOCUMENTS

| | | | | |
|---|---|---|---|---|
| CN | 201573630 | * | 9/2010 | ................ B60T 5/00 |
| CN | 202124031 | * | 1/2012 | ................ B60T 5/00 |
| CN | 202847667 | * | 3/2013 | ................ B60T 5/00 |
| FR | 2796024 A1 | * | 1/2001 | ............. B60T 1/065 |
| JP | H05215158 | * | 8/1993 | ............. F16D 65/84 |

* cited by examiner

*Primary Examiner* — Christopher P Schwartz
(74) *Attorney, Agent, or Firm* — Schmeiser, Olsen & Watts LLP

(57) ABSTRACT

A vehicle brake cooling system is provided. The vehicle brake cooling system is configured to actively cool brake elements affecting one or more wheels of the vehicle during the periods of vigorous or prolonged application of a vehicle's brakes to prevent overheating. The system is filled with a suitable coolant fluid which is pressurized to flow through a nozzle or a system of nozzles onto a brake element during active braking, cooling the brake element. Manual or automatic operation is disclosed, including use of temperature or pressure sensors. A method of use of a vehicle brake cooling system is also disclosed.

16 Claims, 4 Drawing Sheets

VEHICLE BRAKE COOLING SYSTEM AND METHOD OF USE

CROSS REFERENCE TO RELATED APPLICATION

This application claims priority to U.S. Provisional Patent Application to William Jefferey entitled "VEHICLE BRAKE COOLING SYSTEM," application No. 62/617,950, filed Jan. 16, 2018, the disclosures of which are hereby incorporated entirely herein by reference.

BACKGROUND OF THE INVENTION

Technical Field

This invention relates to cooling systems for vehicle brakes. Specifically, embodiments of the invention relate to a cooling system for vehicle braking elements utilizing a liquid coolant.

State of the Art

Vehicle brakes are susceptible to overheating during prolonged application, such as while traveling downhill. Friction between the brake shoes and the braking surface, which may be a brake drum or disc, generates heat which is transferred to the braking surface, the brake caliper, hydraulic brake fluid contained within the caliper, and other elements of a brake system. Heating of the various brake elements to extreme temperatures may occur, leading to melting of the brake shoe material, warping of the braking surface, boiling of the brake fluid within the caliper, smoking of the brake shoe material, and even ignition and burning of the petroleum-based hydraulic brake fluid. Accumulation of heat in these and other brake elements may lead to markedly diminished braking capability, or complete failure of the vehicle's brake system. Failure of a motor vehicle's brakes may result in vehicle and other property damage, severe injury, and death.

Historically, brakes are rapidly cooled by the airflow over the braking surfaces and other brake elements created by the moving vehicle. Indeed, it is widely recommended to cool brake elements of a car or truck which has experienced overheated brakes, manifest by a burning smell or visible smoke coming from the vehicle's wheels, by driving at moderate speeds for several minutes without applying the brakes. While effective at cooling brakes during non-braking periods, simple airflow over the brake elements is ineffective at preventing the brakes from overheating during prolonged or vigorous (high-friction) braking.

Accordingly, what is needed is a system for actively cooling brake elements during the periods of vigorous or prolonged application of a vehicle's brakes.

SUMMARY OF THE INVENTION

Embodiments of the present invention include a vehicle brake cooling system. The system, generally, delivers a stream of coolant fluid onto a brake element, such as a brake drum, disc, shoe, pad, caliper, or a vehicle brake element containing brake fluid to cool the brake element during active braking or other periods when the brake element is hot. The coolant fluid is delivered manually upon operator activation of a pumping means, or automatically in response to a brake element reaching a predetermined temperature during braking.

Disclosed is a vehicle brake cooling system comprising a reservoir containing a coolant fluid; a pump coupled to the reservoir; a nozzle coupled to the pump, the nozzle being configured to spray coolant fluid onto a vehicle brake element; a sensor configured to sense the temperature of the vehicle brake element; and a switch coupled to the sensor and to the pump, the switch being configured to control activation of the pump, wherein the switch activates the pump when the temperature of the vehicle brake element exceeds a predetermined temperature, whereby at least a portion of the coolant fluid is sprayed through the nozzle in response to activation of the pump.

In use, a vehicle brake cooling system is operatively coupled to a vehicle.

In some embodiments, the pump is operational between a quiescent and a pumping mode. In some embodiments, a temperature sensor is in communication with a brake element and the pump. In some embodiments, the nozzle is configured to direct the coolant fluid onto the brake element when the pump is in the pumping mode. In some embodiments, the pump is activated to transition from the quiescent mode to the pumping mode, moving coolant fluid from the reservoir through the nozzle onto the brake element when the temperature of the brake element exceeds a predetermined value.

In some embodiments, the coolant fluid may be water. In some embodiments, the coolant fluid may be a polyalkylene glycol. In some embodiments, the brake element may be any of a brake drum, a brake disc, a brake shoe, a brake pad, a brake caliper, or a vehicle brake element containing brake fluid.

In some embodiments, the vehicle brake cooling system further comprises a switch electrically coupled to the pump, wherein manual activation of the switch activates the pump causing coolant fluid to flow through the nozzle onto the brake element. In some embodiments, the nozzle is a shaped-orifice nozzle configured to direct a shaped stream of the coolant fluid onto a surface of the brake element. For example, the shaped-orifice nozzle may be a flat fan-shaped orifice.

In some embodiments, the vehicle brake cooling system further comprises a temperature sensor coupled to the brake element. In some embodiments, the system further comprises a temperature activated switch electrically coupled to the temperature sensor and the pump, wherein upon receiving a first temperature value reading from the temperature sensor, the temperature activated switch energizes the pump. In some embodiments, under a condition wherein a second temperature value reading of the temperature sensor is transmitted to the temperature activated switch, the temperature activated switch de-energizes the pump. For example, the sensor may be communicatively coupled to the switch by a feedback control loop, whereby the switch is activated when the temperature of the brake element, as sensed by the sensor, meets or exceeds a predetermined value, and the switch is deactivated when the temperature of the brake element falls below that value.

A method of use of a vehicle brake cooling system is also disclosed.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

The foregoing application describes a vehicle brake cooling system for cooling elements of a brake system during braking, to prevent overheating of the brake system. The system provides for cooling of brake calipers, shoes, drums, discs, pads, brake elements containing brake fluid, and/or any other vehicle brake element, during active braking to prevent overheating of various brake elements. The system additionally prevents or mitigates the effects of overheated brake elements, such as warped brake drums and discs, melting or smoking brake shoes, fires involving brake shoes or hydraulic brake fluid, and damage to other components of a vehicle's brake system upstream from the brake caliper.

Various embodiments of the device include a coolant fluid contained by a reservoir, a nozzle for directing the coolant fluid onto a brake element, and a system of tubing for delivering the coolant fluid to the nozzle. A pump pressurizes the system, under a condition wherein the pump is activated, either volitionally by a driver/operator or by automatic activation of the pump by a temperature sensor coupled to a brake element.

Figure 1:
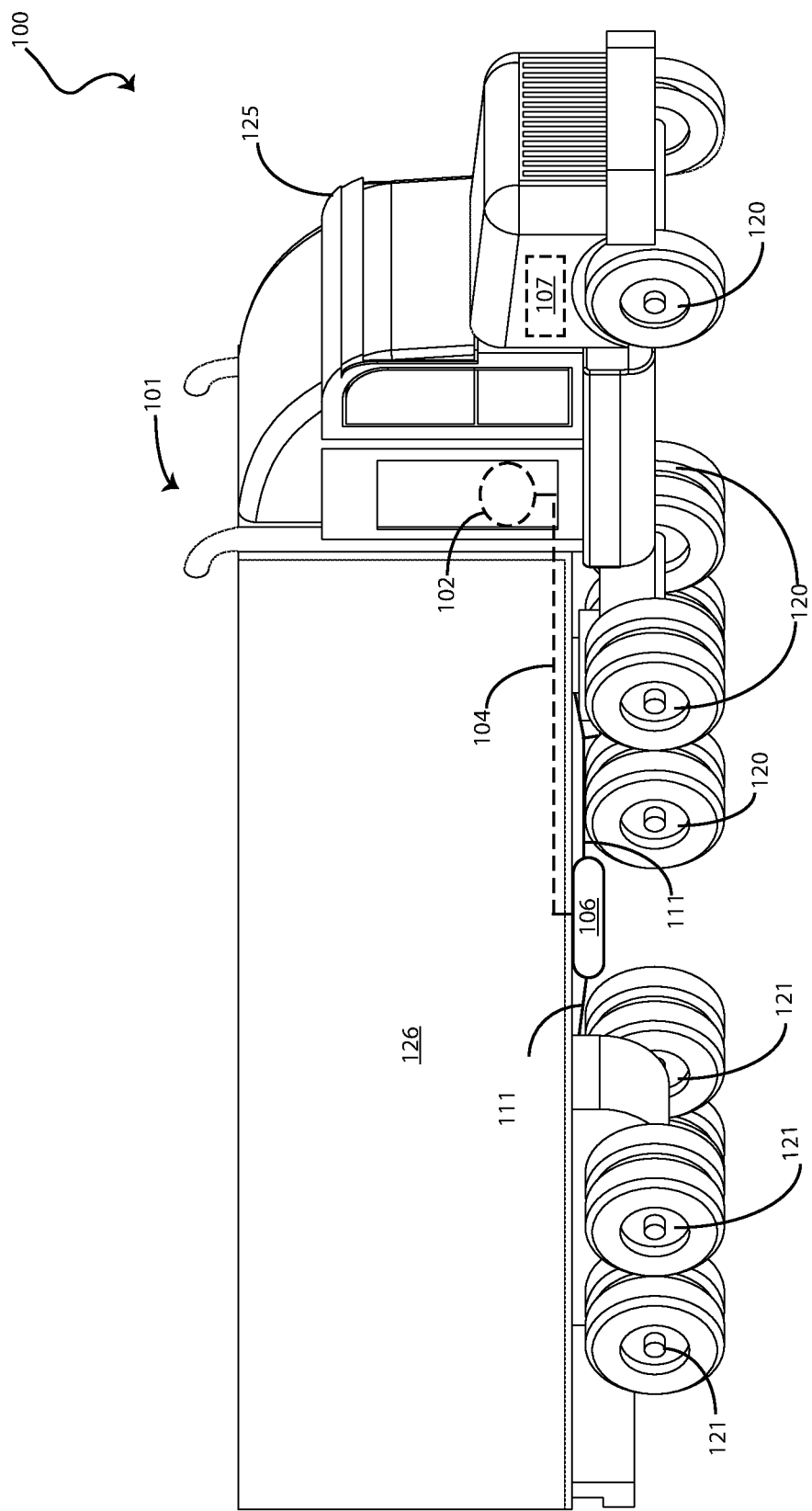
FIG. 1 is a perspective view of a semi tractor-trailer truck with a vehicle brake cooling system, in accordance with an embodiment.

FIG. 1 is a perspective view of a semi tractor-trailer truck with a vehicle brake cooling system. FIG. 1 shows a vehicle 101, a typical tractor-trailer rig, comprising a tractor cab 125 coupled to a trailer 126. In the embodiment shown in FIG. 1, vehicle 101 has eighteen (18) wheels. This is in no way intended to be limiting. Vehicle 101 may comprise a passenger automobile, a light-truck, a heavy truck, a bus or van; a railway vehicle such as a train locomotive or a rail car; a commuter light rail vehicle such as a subway vehicle, an elevated train vehicle, or the like; an aircraft comprising landing wheels; and the like, without limitation in design, wheel type, or number of wheels.

Brakes may be installed on a tractor wheel 120, a trailer wheel 121, or both tractor wheel 120 and trailer wheel 121. In the non-limiting example embodiment shown in FIG. 1, brakes are installed on the front and rear wheels of the tractor (ten (10) total), shown as tractor wheels 120. Brakes are additionally disposed on trailer wheels 121 totaling eight additional wheels. Tractor cab 125 is coupled to a trailer 126. A vehicle brake cooling system 100 is installed and acts to cool brake elements acting on a tractor wheel 120 and a trailer wheel 121. In some embodiments, vehicle brake cooling system 100 acts on a plurality of tractor wheels 120, a plurality of trailer wheels 121, or a plurality of both tractor wheels 120 and trailer wheels 121. FIG. 1 additionally shows various elements of brake cooling system 100, including but not limited to a reservoir 102, a distribution hose 104, a pump 106, a power source 107, and a coolant tubing 111. Details of these and other elements of vehicle brake cooling system 100 are discussed in detail with reference to drawing figures herein below.

Figure 2:
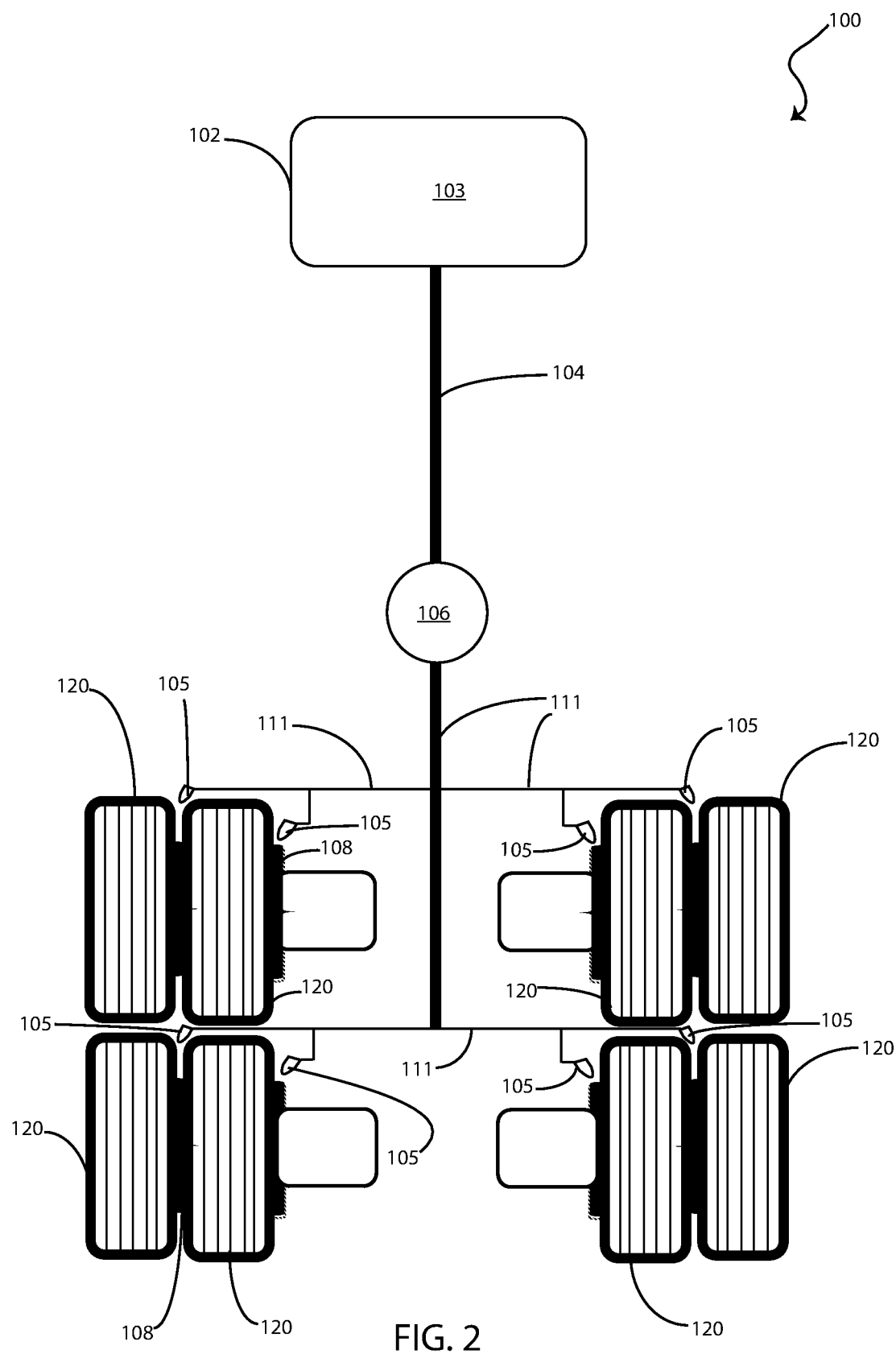
FIG. 2 is a top diagram view of a vehicle brake cooling system, in accordance with an embodiment.

FIG. 2 is a top diagram view of a vehicle brake cooling system. FIG. 2 shows elements of vehicle brake cooling system 100 installed on a tractor of a tractor-trailer semi-truck. The components of system 100 shown by FIG. 2, however, may be installed on any vehicle 101. A coolant fluid 103 is stored in reservoir 102 for distribution through lengths of a coolant tubing 111 to a nozzle 105. Pump 106 draws coolant fluid 103 from reservoir 102 through distribution hose 104 and pressurizes coolant tubing 111 under a condition wherein system 100 delivers coolant fluid 103 to a surface of a brake element 108 through nozzle 105.

Coolant 103 ultimately captures and disperses heat from brake element 108 into the environment, acting as a thermal transfer cooling means for brake element 108. Consequently, is desirable, although not required, for coolant 103 to have certain characteristics. These characteristics include, but are not limited to, thermal conductivity, a relatively low thermal inertia, a high latent heat of evaporation, and to be non-toxic to humans and the environment generally. Coolant 103, therefore, comprises a liquid substance, in some embodiments, and is directed onto a surface of brake element 108 as a liquid. Some non-limiting examples of liquid substances comprising coolant 103 include water, propylene glycol, ethylene glycol, other alkylated glycols, and the like. In some embodiments, coolant 103 is a liquid substance, such as a volatile refrigerant, and passes through nozzle 105 as a liquid, whereupon coolant 103 is vaporized and is directed onto a surface of brake element 108 as a gas. Other suitable examples of the composition of coolant 103 may be utilized in some embodiments.

Reservoir 102 holds coolant 103 until such time delivery of coolant 103 onto a brake element 108 is effected by system 100. Reservoir 102 is mounted on tractor cab 125, in some embodiments. In some embodiments, reservoir 102 is mounted on trailer 126. In some embodiments, reservoir 102 is mounted in an engine compartment of vehicle 101. In some embodiments of vehicle brake cooling system 100, reservoir 102 is mounted elsewhere. The volumetric capacity of reservoir 102, ideally, is between about one (1) gallon and about ten (10) gallons, wherein vehicle 101 is a tractor-trailer combination. In a passenger automobile, however, the capacity of reservoir 102 may be less than about one gallon. In some embodiments, the capacity of reservoir 102 is greater than about ten (10) gallons. Reservoir 102 is depicted as a rectangular or round-shaped tank in the several drawing figures, however this is not meant to be limiting. Reservoir 101 has any shape required by the design of vehicle 101 in which system 100 is installed, or by the choice of the designer of vehicle 101 or the builder or installer of system 100. A prototype of system 100 having reservoir 102 with a capacity of seven gallons was tested in a heavy dump-truck vehicle over a three-thousand (3,000) mile route, including a stretch of hilly and mountainous terrain, wherein system 100 utilized less than about seven gallons of coolant fluid 103 pumped from reservoir 102.

Pump 106 is operatively coupled between distribution hose 104 and coolant tubing 111 and configured to pressurize coolant tubing 111, in some embodiments. When activated, pump 106 pressurizes coolant tubing 111. In some embodiments lacking distribution hose 104, pump 106 is fluidly coupled to reservoir 102 and, when activated, pressurizes reservoir 102 directly. Pressurized reservoir 104, in some embodiments, is fluidly coupled to coolant tubing 111, wherein coolant fluid 103 flows through coolant tubing 111 and through a nozzle 105, which directs the pressurized coolant fluid 103 onto a surface of brake element 108. Alternatively, in some embodiments, pump 106 is fluidly coupled between distribution hose 103 and nozzle 105, wherein pump 106 draws fluid from reservoir 102 through distribution hose 104 pressuring nozzle 105.

Pump 106 may be any hydrostatic pump available and known in the hydraulic arts for pumping and pressurizing a fluid, such as a water-based fluid. In some embodiments, pump 106 has a working pressure of between about sixty (60) pounds per square inch (psi) and about one hundred (100) psi.

FIG. 2 additionally shows a plurality of nozzles 105 fluidly coupled to coolant tubing 111. Nozzle 105, in some embodiments, is a spray nozzle. In some embodiments, nozzle 105 is a shaping spray nozzle. In some embodiments, nozzle 105 is a flat fan-spray shaping nozzle. For example, brake element 108 may be an outer surface of a brake drum, as shown by FIG. 2. In this and some other embodiments, nozzle 105 may comprise a shaped-spray nozzle wherein nozzle 105 directs a flat-fan spray of coolant 103 onto the outer surface of the brake drum brake element but does not substantially overspray beyond the brake element surface. This configuration is offered by way of example, and not meant to be limiting. In some embodiments, nozzle 105 is a swirl nozzle causing coolant 103 to flow from nozzle 105 onto the brake element surface in a cone-shaped spray.

FIG. 2 shows a means for a plurality of cooling brake elements 108 associated with a plurality of tractor wheels 120, although this is not meant to be limiting. System 100 may provide a means for cooling one vehicle wheel, such as tractor wheel 120, a plurality of vehicle wheels, or all the wheels on a vehicle, as in the embodiment shown by FIG. 2, and in some other embodiments.

Figure 3:
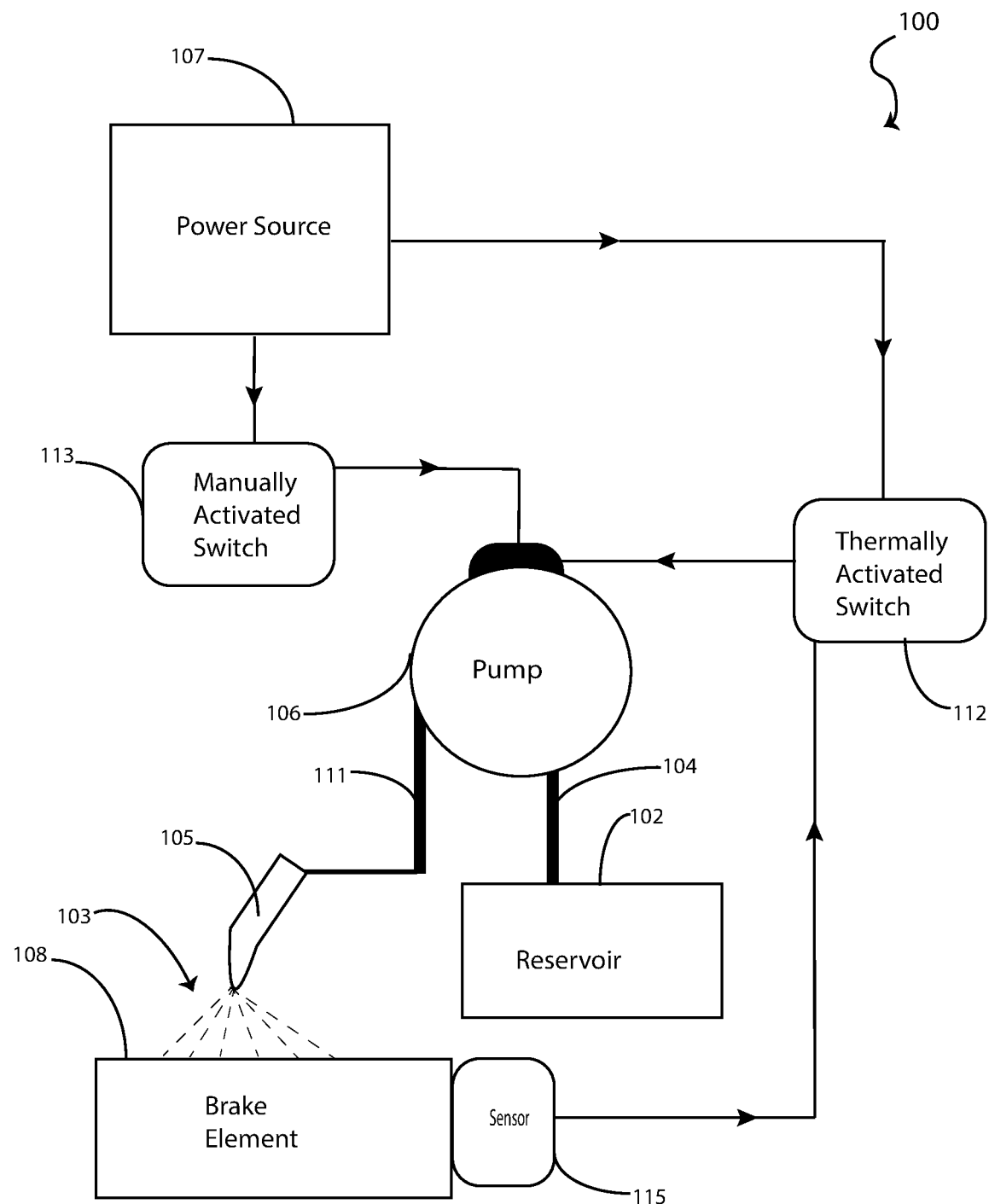
FIG. 3 is a schematic view of a vehicle brake cooling system, in accordance with an embodiment.

FIG. 3 is a schematic view of a vehicle brake cooling system. FIG. 3 shows various fluid, electrical, and thermal couplings of an embodiment of vehicle brake cooling system 100. Arrows present along couplings connote the direction of flow of electrical power, an electrical signal, coolant fluid 103, or sensor information, according to the elements coupled by the arrowed lines. Power source 107 provides electrical power to pump 106. Other embodiments comprised by some embodiments of system 100, such as a thermally activated switch 112, a manually activated switch 112, or a sensor 115 are electrically coupled to and powered by power source 107. In some embodiments, power source 107 is a primary engine battery of vehicle 101, such as a standard twelve-volt vehicle sealed set-cell battery. In some embodiments, power source 107 is a secondary or auxiliary battery. In some embodiments, power source 107 is dedicated to system 100 and is electrically isolated from other electrical components of vehicle 101 not part of system 100.

Pump 106 is activated either manually or automatically. For example, in some embodiments, vehicle brake cooling system 100 comprises a manually activated switch 113. Switch 113 is any electrical switch, whether solid-state or electronic, which an operator of vehicle 101 may engage to activate pump 106 with electrical power from power source 107 to pressurize coolant tubing 111. In some embodiments, switch 113 is disposed in a driver's compartment within vehicle 111, such as within the cab of a semi tractor-trailer or heavy truck.

In some embodiments, system 100 comprises a sensor 115 thermally coupled to brake element 108, shown schematically by FIG. 3. Wherein, during active braking, brake element 108 reaches a first temperature value, sensor 115 generates a first signal which is transmitted to thermally activated switch 112. Thermally activated switch 112, in turn, activates pump 106 with electrical energy from power source 107.

It should be appreciated that various means of regulating, limiting, switching, or controlling the flow of coolant 103 through nozzle 105 onto brake element 108 are contemplated by this disclosure. For example, in some embodiments (not shown) a pressure activated switch is electrically coupled between power source 107 and pump 106 and activates pump 106 intermittently to maintain a hydrostatic pressure of coolant 103 at a set value or range of values. In some embodiments, the hydrostatic pressure is maintained within reservoir 102. In some embodiments, the hydrostatic pressure is maintained within coolant tubing 111.

In some embodiments, a valve (not shown) is interposed in a length of coolant tubing 111. The valve is configured to have a closed position, wherein no coolant fluid 103 flows from valve 105, and at least one open position wherein coolant fluid 103 flows from valve 105 onto brake element 108. In some embodiments, valve 105 comprises a plurality of indexed open positions. In some embodiments, valve 105 comprises a continuum of open positions. In some embodiments, nozzle 105 comprises or is coupled to the valve. In some embodiments, the valve is fluidly coupled between coolant tubing 111 and valve 105. In some embodiments, the valve is manually controlled with a valve switch (not shown) configured to move the valve from the closed position to an open position, or from an open position to the closed position, or along a continuum of open positions. In some embodiments, the valve is automatically controlled by a pressure sensor (not shown) operatively coupled to the valve. In some embodiments, the flow of coolant fluid 103 through nozzle 105 is automatically controlled by both a pressure sensor and a temperature sensor operatively coupled to the valve.

In some embodiments, the first signal is transmitted though electrical coupling of sensor 115 with thermally activated switch 112. In some embodiments, the first signal is transmitted wirelessly to thermally activated switch 112. In some embodiments, a control module (not shown) comprises thermally activated switch 112. The control module may be an electronic control module, an automatic braking control module, a computer processing unit, or the like.

The components defining any vehicle brake cooling system may be formed of any of many different types of materials or combinations thereof that can readily be formed into shaped objects provided that the components selected are consistent with the intended operation of a vehicle brake cooling system. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any vehicle brake cooling system may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, annealing, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

Figure 4:
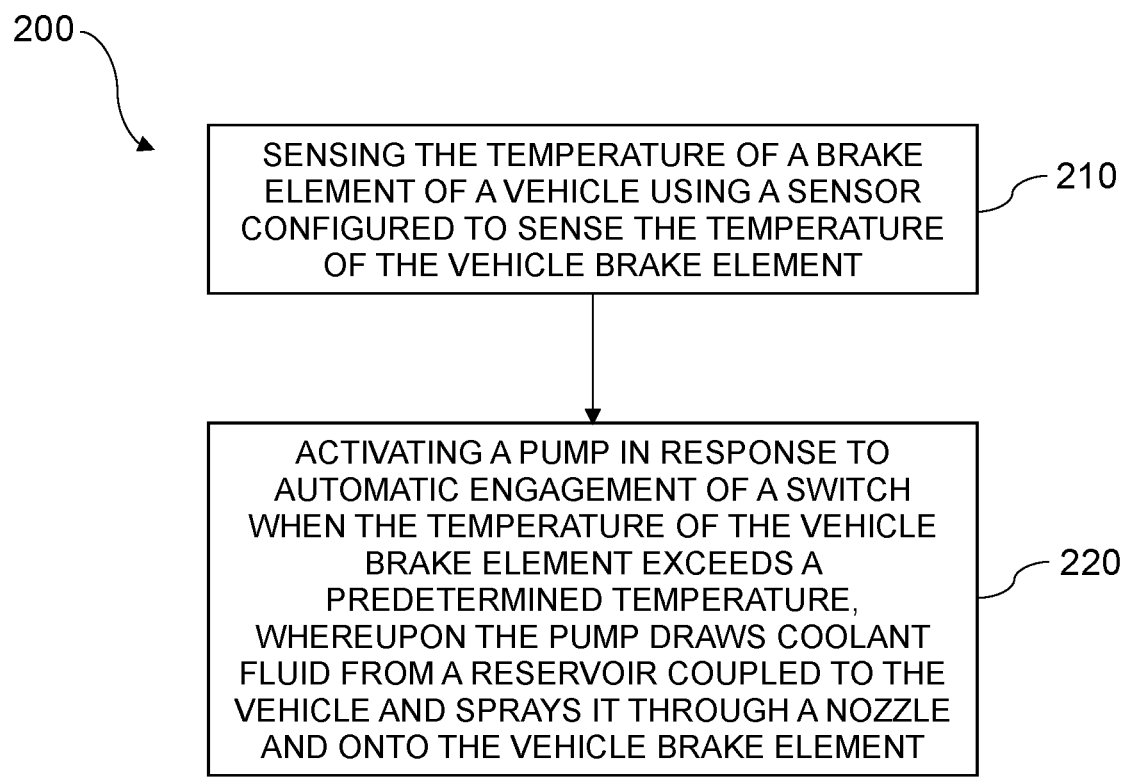
FIG. 4 is a flowchart of a method use of a vehicle brake cooling system, in accordance with an embodiment.

FIG. 4 is a flowchart of a method 200 of using a vehicle brake cooling system comprising: sensing the temperature of a brake element of a vehicle using a sensor configured to sense the temperature of the vehicle brake element [Step 210]; and activating a pump in response to automatic engagement of a switch when the temperature of the vehicle brake element exceeds a predetermined temperature, whereupon the pump draws coolant fluid from a reservoir coupled to the vehicle and sprays it through a nozzle and onto the vehicle brake element [Step 220].

A vehicle brake cooling system, including a method of formation, is disclosed. The vehicle brake cooling system and method of formation overcome deficiencies of the existing art by allowing an operator of a vehicle, such as a semi tractor-trailer truck or similar heavy truck to minimize or prevent the effects caused by overheated brake elements, including brake failure and fires. Embodiments wherein automatic activation of the vehicle brake cooling system that do not require input or other actions by a human operator are also discussed.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A semi tractor-trailer truck brake cooling system comprising:
   a reservoir containing a coolant fluid, the reservoir mounted on a trailer of a semi tractor-trailer truck;
   a pump coupled to the reservoir;
   a nozzle coupled to the pump, the nozzle being configured to spray coolant fluid onto a vehicle brake drum;
   a sensor configured to sense the temperature of the vehicle drum; and
   a switch coupled to the sensor and to the pump, the switch being configured to control activation of the pump, wherein the switch activates the pump when the temperature of the vehicle brake drum exceeds a predetermined temperature or wherein manual activation of the switch activates the pump, whereby at least a portion of the coolant fluid is sprayed through the nozzle in response to activation of the pump.

2. The brake cooling system of claim 1, wherein the coolant fluid is water.

3. The brake cooling system of claim 1, wherein the coolant fluid is polyalkylene glycol.

4. The brake cooling system of claim 1, wherein the nozzle is a flat fan spray nozzle.

5. The brake cooling system of claim 1, wherein the switch is activated manually by a user.

6. The brake cooling system of claim 1, further comprising a vehicle, wherein each of the reservoir, the pump, the nozzle, the sensor, and the switch is coupled to the vehicle.

7. A semi tractor-trailer truck brake cooling system comprising:
   a reservoir, the reservoir containing a coolant fluid and the reservoir mounted on a trailer of a semi tractor-trailer truck;
   a pump coupled to the reservoir;
   a nozzle coupled to the pump, the nozzle being configured to spray coolant fluid onto a vehicle brake drum of the vehicle; and
   a switch coupled to the pump, wherein a user may control the switch to activate or deactivate the pump, whereby at least a portion of the coolant fluid is sprayed through the nozzle onto the vehicle brake drum in response to activation of the pump.

8. The brake cooling system of claim 7, wherein the coolant fluid is water.

9. The brake cooling system of claim 7, wherein the coolant fluid is polyalkylene glycol.

10. The brake cooling system of claim 7, wherein the nozzle is a flat fan spray nozzle.

11. The brake cooling system of claim 7, further comprising a sensor coupled to the switch, the sensor being configured to sense the temperature of the vehicle brake drum, wherein the switch activates the pump automatically when the temperature of the vehicle brake drum exceeds a predetermined temperature.

12. A method of using a semi tractor-trailer truck brake cooling system comprising:
   sensing the temperature of a brake drum of a semi tractor-trailer truck using a sensor configured to sense the temperature of the vehicle brake drum; and
   activating a pump in response to automatic engagement of a switch when the temperature of the vehicle brake drum exceeds a predetermined temperature, whereupon the pump draws coolant fluid from a reservoir coupled to a trailer of the semi tractor-trailer truck and sprays it through a nozzle and onto the vehicle brake drum.

13. The method of claim 12, wherein the coolant fluid is water.

14. The method of claim 12, wherein the coolant fluid is polyalkylene glycol.

15. The method of claim 12, wherein the nozzle is a flat fan spray nozzle.

16. The method of claim 12, wherein the switch may be controlled manually by a user.

* * * * *